S. A. Hedges.
Fertilizer.
Nº 9,536.  Patented Jan. 11, 1853.
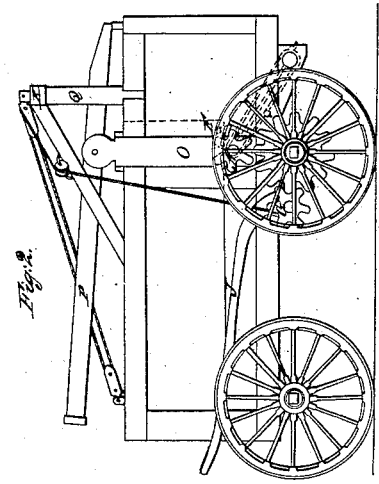
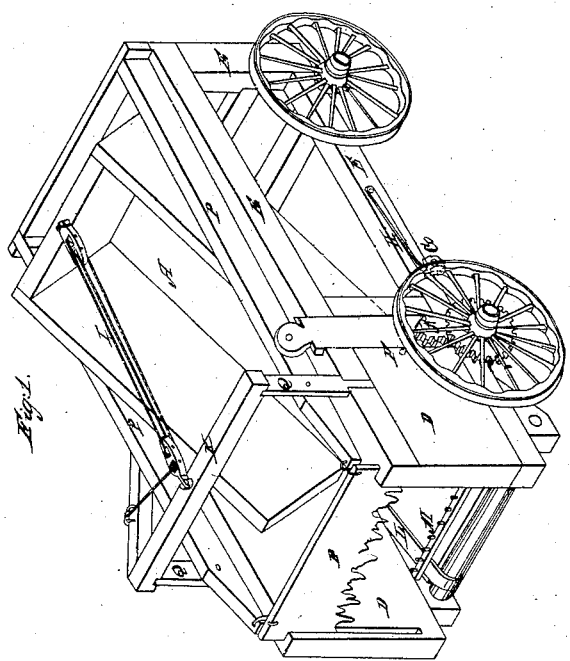

UNITED STATES PATENT OFFICE.

SILAS A. HEDGES, OF LANCASTER, OHIO.

IMPROVEMENT IN MANURE-SPREADERS.

Specification forming part of Letters Patent No. 9,535, dated January 11, 1853.

*To all whom it may concern:*

Be it known that I, SILAS A. HEDGES, of Lancaster, Fairfield county, Ohio, have invented certain new and useful Improvements in Carts for Spreading Manures; and I do hereby declare that the following is a full, clear, and exact description thereof, reference being had to the accompanying drawing and letters marked thereon, forming a part of this specification.

The accompanying drawing represents an isometrical and side elevation of my improved cart, in each of which figures where the same parts are shown they are designated by the same letters of reference.

My improvements consist in constructing a cart with two bodies, the front one of which is capable of being raised so as to discharge the manure into the rear one by means of throwing a shaft, which is connected with the front end of it by a tackle, into gear with the hind axle, and in providing an inclined endless apron in the rear body, which is also actuated by the hind axle, and so arranged with the tail-board that, by means of a lever, it is thrown into gear simultaneously with the raising of the tail-board.

Figure 1 represents the front body, A, as raised. The tail-board B is broken off, so as to show the endless apron L. The rear body, D, forms a part of the frame of the cart E E, and the front cart is hinged to it at F, and working in bearings under the cart and parallel with the hind axle is a shaft, G, provided with a pinion on one end and a ratchet-wheel and pawl, H, on the other end, to which is attached the halyard of the tackle I, one block of which tackle is attached to the tie K and the other to the front end of the front body, so that by throwing said shaft into gear with the hind axle by means of the lever J, the front end of the bodies A will be raised by the action of the hind axle, which will cause the manure to descend into the rear body, and from thence be discharged by the endless apron. The endless apron L forms the bottom of the rear body, and (is provided with a suitable number of slats, M, with projecting teeth for taking hold of the manure and discharging it through the opening formed by the raising of the tail-board) it passes over the axle N, which has its bearings in guides O O, which slide vertically in dove-tailed grooves in the sides of the frame E E, and jointed to the ends of these guides O O are two levers, P P, which have their fulcrums on the supports Q Q of the tie K, and their short arms are connected with the tail-board B, so that by depressing the long arms of said levers P P the axle N, which is provided with pinions at each end, will be thrown into gear with the hind axle of the cart, and at the same time the tail-board will be raised. The front body is filled with any description of manure, and when arriving on the field where the manure is to be distributed the axle connected with the tackle for raising the front end is thrown into gear, which causes the manure to descend into the rear body. When it is sufficiently elevated, the axle is thrown out of gear again, and the pawl and ratchet H will prevent the shaft G from turning and retain the body in its elevated position. The rear body is thus kept supplied with manure. The apron is then thrown into gear, which operation at the same time raises the tail-board, and the manure is then forced out in a thin sheet through the opening between the tail-board and the apron.

This construction of cart distributes manure thin and evenly over the field with very little waste.

Having thus fully described my invention, what I claim therein as new, and desire to secure by Letters Patent, is—

1. Constructing a manure-cart with two bodies, the front one of which is raised or tilted for the discharge of manure into the rear one by the action of the hind axle, by means of the axle G and tackle I, when thrown into gear by the hand-lever J, arranged and operating in the manner and for the purpose set forth.

2. The combination of the endless apron, the tilting body, and raising the tail-board simultaneously with throwing in gear the endless slotted apron, in the manner and for the purposes fully set forth.

In testimony of the above amendment the aforesaid S. A. HEDGES has hereunto signed his name before two subscribing witnesses.

S. A. HEDGES.

Witnesses:
W. C. ROCHER,
B. CONNELL.